US012002215B2

(12) United States Patent
Huang et al.

(10) Patent No.: US 12,002,215 B2
(45) Date of Patent: Jun. 4, 2024

(54) METHOD AND APPARATUS FOR COMPENSATING IMAGE SEGMENTATION LINES

(71) Applicant: Acer Medical Inc., New Taipei (TW)

(72) Inventors: Shih-Ho Huang, New Taipei (TW); Ming-Tzuo Yin, New Taipei (TW)

(73) Assignee: Acer Medical Inc., New Taipei (TW)

( * ) Notice: Subject to any disclaimer, the term of this patent is extended or adjusted under 35 U.S.C. 154(b) by 429 days.

(21) Appl. No.: 17/506,637

(22) Filed: Oct. 20, 2021

(65) Prior Publication Data

US 2023/0073729 A1 Mar. 9, 2023

(30) Foreign Application Priority Data

Sep. 9, 2021 (TW) .................................. 110133651

(51) Int. Cl.
*G06T 7/13* (2017.01)
*G06T 7/00* (2017.01)

(52) U.S. Cl.
CPC .............. *G06T 7/13* (2017.01); *G06T 7/0012* (2013.01); *G06T 2207/10101* (2013.01); *G06T 2207/20081* (2013.01); *G06T 2207/20084* (2013.01)

(58) Field of Classification Search
CPC ..................... G06T 7/13; G06T 7/0012; G06T 2207/10101; G06T 2207/20081; G06T 2207/20084
See application file for complete search history.

(56) References Cited

U.S. PATENT DOCUMENTS

2021/0110537 A1\* 4/2021 Wakeford ............... G06T 7/143

FOREIGN PATENT DOCUMENTS

CN 112037231 12/2020

OTHER PUBLICATIONS

Yufan He et al., "Topology guaranteed segmentation of the human retina from OCT using convolutional neural networks", Computer Science, Cornell University Library, Mar. 14, 2018, pp. 1-9.
Gao Zhijun et al., "A Review of Segmentation and Classification for Retinal Optical Coherence Tomography Images", 2021 IEEE 2nd International Conference on Pattern Recognition and Machine Learning, Jul. 16, 2021, pp. 129-135.
(Continued)

*Primary Examiner* — Casey L Kretzer
(74) *Attorney, Agent, or Firm* — JCIPRNET

(57) ABSTRACT

A method and an apparatus for compensating image segmentation lines are provided. In the method, image segmentation is applied to a medical image captured by using a segmentation model to obtain a segmentation image including at least one segmentation line between multiple layers in the medical image. Convolution computation is then performed on the segmentation image by using a kernel of a trained classification model to predict a location of a next pixel connected to a current pixel in the respective segmentation line within the segmentation image, in which the pixel to be predicted is limited to a neighboring pixel of the current pixel in a prediction direction. The predicted pixels are connected to form a compensated segmentation line for each segmentation line.

10 Claims, 6 Drawing Sheets

(56) References Cited

OTHER PUBLICATIONS

Ben-Cohen Avi et al., "Retinal layers segmentation using Fully Convolutional Network in OCT images", retrieved on Apr. 27, 2022, pp. 1-8. Available at: https://www.rsipvision.com/wp-content/uploads/2017/06/Retinal-Layers-Segmentation.pdf.

Stefan Sabina et al., "Deep learning toolbox for automated enhancement, segmentation, and graphing of cortical optical coherence tomography microangiograms", Biomedical Optics Express, vol. 11, No. 12, Dec. 2020, pp. 7235-7342. Available at: https://www.ncbi.nlm.nih.gov/pmc/articles/PMC7747889/pdf/boe-11-12-7325.pdf.

"Search Report of Europe Counterpart Application", dated May 23, 2022, p. 1-p. 11.

* cited by examiner

METHOD AND APPARATUS FOR COMPENSATING IMAGE SEGMENTATION LINES

CROSS-REFERENCE TO RELATED APPLICATION

This application claims the priority benefit of Taiwan application serial no. 110133651, filed on Sep. 9, 2021. The entirety of the above-mentioned patent application is hereby incorporated by reference herein and made a part of this specification.

BACKGROUND

Technical Field

The disclosure relates to a method and an apparatus for image processing, particularly to a method and an apparatus for compensating image segmentation lines.

Description of Related Art

Compared with fundus examination, optical coherence tomography (OCT) allows the observer to see the lesions in the retina better, as OCT is capable of providing a clear observation of every layer in the retina. Therefore, when looking for subtle lesions of macular degeneration, OCT can provide cross-sectional images invisible to the naked eyes, and it can also calculate the retinal thickness that cannot be assessed by the naked eye, helping ophthalmologists give more accurate diagnosis and suitable treatment to patients.

Image segmentation is an important research topic in the field of computer vision and a critical part of image semantic comprehension. The research of image segmentation has made its way to the field of deep learning, transforming itself from image recognition to making intensive prediction of each pixel of the input image by using models to segment the layers through OCT. However, as the segmentation results are under the sway of the model predictions, it is possible to find severed boundaries in the segmentation results, and it is necessary to compensate for those gaps.

The current approach for gap compensation is to employ linear interpolation to calculate the middle pixel based on its neighboring pixels using interpolation to compensate for the severed boundary. FIG. 1 shows an example of using the conventional linear interpolation to compensate for the severed boundary in an image. In FIG. 1, the image 12 is a segmentation image obtained by performing image segmentation on an OCT image with a conventional segmentation model, and the image 12 includes multiple segmentation lines. Due to the segmentation model, the segmentation line 12a is severed by the concave part in the middle. The image 14 is the resulting image generated after performing linear interpolation on the severed boundary in the image 12. As shown by the compensation line 14a in the image 14, since the linear interpolation takes reference from the neighboring pixels, the image after linear interpolation usually does not show a continuous result or does not have the effect as expected when the color near the target pixel is too similar to or too different from it.

SUMMARY

An embodiment of the present disclosure provides a method for compensating image segmentation lines, which is suitable for electronic apparatus with a processor. The method includes: segmenting a captured medical image by adopting a segmentation model to obtain a segmentation image including at least one segmentation line between multiple layers in the medical image; performing a convolution operation on the segmentation image by adopting a kernel of a trained classification model to predict the position of the next pixel connected to the current pixel of the respective segmentation line in the segmentation image, where the predicted pixel is a neighboring pixel of the current pixel in a prediction direction; and connecting the predicted pixels to form a compensated segmentation line for the respective segmentation line.

An embodiment of the present disclosure provides an apparatus for compensating image segmentation lines, and the apparatus includes an image capturing device, a storage device, and a processor. The image capturing device is adapted to capture a medical image, and the storage device is adapted to store a computer program. The processor is coupled to the image capturing device and the storage device, and is configured to load and execute the computer program to segment the captured medical image by adopting a segmentation model to obtain a segmentation image including at least one segmentation line between multiple layers in the medical image, perform a convolution operation on the segmentation image by adopting a kernel of a trained classification model to predict the position of the next pixel connected to the current pixel of the respective segmentation line in the segmentation image, where the predicted pixel is a neighboring pixel of the current pixel in a prediction direction, and connect the predicted pixels to form a compensated segmentation line for the respective segmentation line.

To make the above-mentioned features and advantages of the present disclosure more comprehensible, the following embodiments are described in detail in conjunction with the accompanying drawings.

DESCRIPTION OF THE EMBODIMENTS

The embodiments of the present disclosure provide a method and an apparatus for compensating image segmentation lines by establishing a classification model using a convolutional neural network (CNN) architecture, which uses a predetermined kernel to scan the segmentation image having a length W to thereby output a sequence having a length W−1. By setting the restriction condition to [−1, 0, +1], the kernel is restricted to predict the y-coordinate trend of the next pixel x, so that each pixel in the x and y directions can be connected. And since it is based on a classification model, it not only compensates for the missing pixels after training, but also learns from the image the features and positions that should be connected, which is smarter and more adaptive than the interpolation algorithms.

Figure 1:
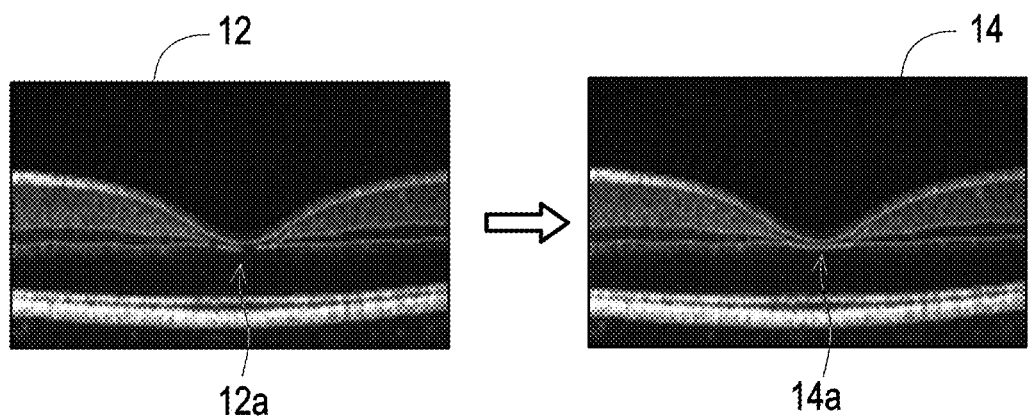
FIG. 1 is an example of compensating for the severed section of an image using the conventional linear interpolation.
Figure 2:
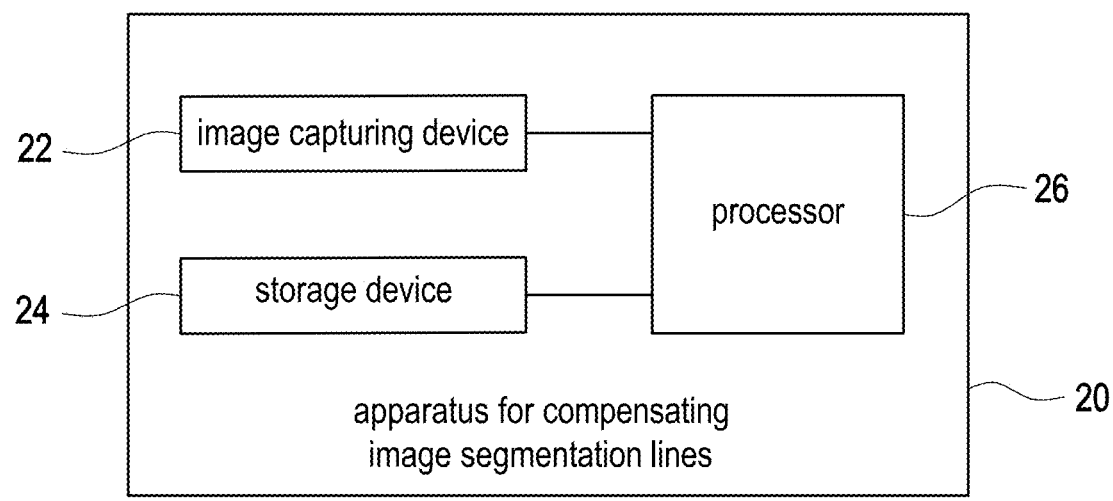
FIG. 2 is a block diagram of an apparatus for compensating image segmentation lines according to an embodiment of the present disclosure.

FIG. 2 is a block diagram of an apparatus for compensating image segmentation lines according to an embodiment of the present disclosure. In FIG. 2, the apparatus for compensating image segmentation lines 20 of the embodiment of the present disclosure is, for example, a computer device, such as a file server, a database server, an application server, a workstation, or a personal computer with computing capabilities, which includes components such as image capturing device 22, storage device 24, and processor 26. The functions of these components are described as follows.

The image capturing device 22 is, for example, a wired or wireless transmission interface such as Universal Serial Bus (USB), RS232, Bluetooth (BT), and wireless fidelity (Wi-Fi), which is adapted to receive medical images provided by image source devices such as cameras, video cameras, and tomography scanners, and output the processed images. In one embodiment, the image capturing device 22 may also include a network card that supports Ethernet or supports wireless network standards, such as 802.11g, 802.11n, and 802.11ac, which allows the apparatus for compensating image segmentation lines 20 to connect to a database or server on the network, and retrieve medical images via the network.

The storage device 24 is, for example, any type of fixed or removable random access memory (RAM), read-only memory (ROM), flash memory, hard disk, any similar components, or a combination of the above components adapted to store computer programs that can be executed by the processor 26.

The processor 26 is, for example, a central processing unit (CPU), or other programmable general-purpose or special-purpose microprocessors, microcontrollers, and digital signal processors (DSP), programmable controller, application specific integrated circuit (ASIC), programmable logic device (PLD), any other similar devices, or a combination of these devices, to which the present disclosure does not limit. In this embodiment, the processor 24 loads a computer program from the storage device 22 to execute the method for compensating image segmentation lines of the embodiment of the present disclosure.

Figure 3:
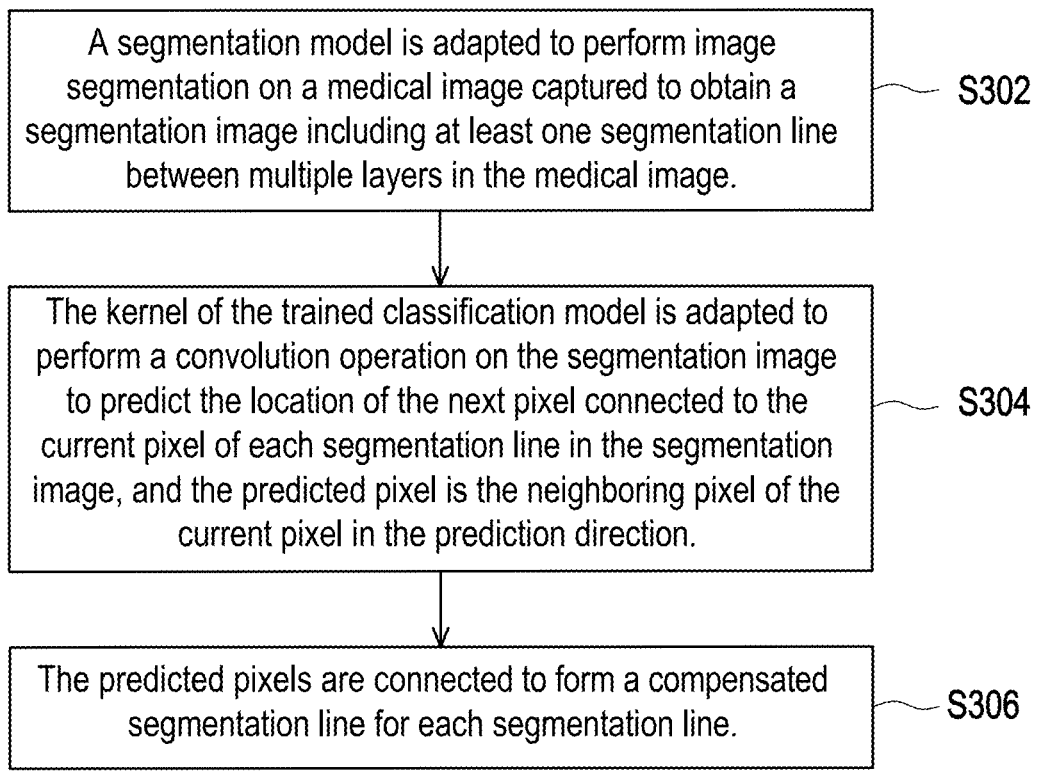
FIG. 3 is a flowchart of a method for compensating image segmentation lines according to an embodiment of the present disclosure.

FIG. 3 is a flowchart of a method for compensating image segmentation lines according to an embodiment of the present disclosure. Please refer to FIG. 2 and FIG. 3 at the same time. The method of this embodiment is applicable to the apparatus for compensating image segmentation lines 20 described above. The detailed steps of the method for compensating image segmentation lines of this embodiment are described below in conjunction with various components of the apparatus for compensating image segmentation lines 20.

In step S302, in the apparatus for compensating image segmentation lines 20, the processor 26 adopts a segmentation model to perform image segmentation on a medical image captured by the image capturing device 22 to obtain a segmentation image including at least one segmentation line between multiple layers in the medical image. The apparatus for compensating image segmentation lines 20 can use images or pictures in any format as input data. The present disclosure does not limit the brand, color, size, or parameter settings of the device that provides the image or picture, as long as the image or picture can be read by the processor 26. In addition, in order to segment the image for subsequent needs, after the processor 26 has captured the medical image, it will first perform, for example, pre-processing on the captured medical image, such as decoding, denoising, and scaling, but this embodiment is not limited thereto.

After obtaining the processed medical image, the processor 26 executes the trained segmentation model to extract from the medical image the segmentation lines between multiple layers. The segmentation model is, for example, a Fourier Convolutional Neural Networks (FCNN) model, or a semantic segmentation model such as U-Net, Seg-Net, and Deeplab, but this embodiment is not limited thereto.

Figure 4:
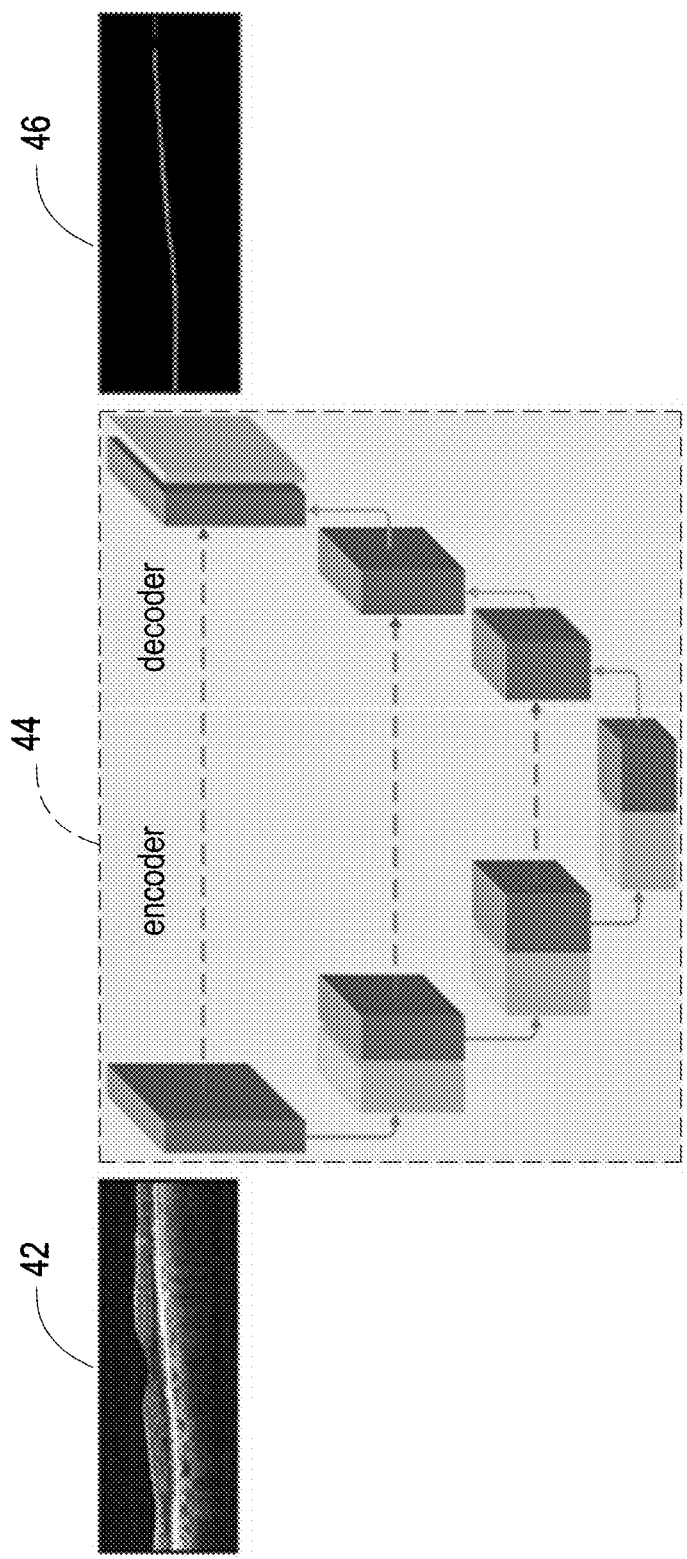
FIG. 4 is a schematic diagram of image segmentation using U-Net according to an embodiment of the present disclosure.

Take U-Net as an example. FIG. 4 is a schematic diagram of image segmentation using U-Net according to an embodiment of the present disclosure. In FIG. 4, in this embodiment, a medical image 42 is used as an input image of a segmentation model 44 using the U-Net architecture. The segmentation model 44 include, for example, performing multiple convolution, pooling, and downsampling operations by the encoder on the input image to extract multiple features in the input image, and performing multiple stitching, convolution, and upsampling operations by the decoder on the feature map to obtain a segmentation image 46 as an output image having the same size as that of the input image. In the U-Net architecture, the encoder of each layer is docked with an opposite decoder, so that the data of the encoder can be output additionally to the decoder of the same layer, which ensures that important information is not lost in the image reconstruction process.

Please refer to the flow in FIG. 3 again. In step S304, the processor 26 adopts the kernel of the trained classification model to perform a convolution operation on the segmentation image to predict the location of the next pixel connected to the current pixel of each segmentation line in the segmentation image, and the predicted pixel is the neighboring pixel of the current pixel in the prediction direction. The neighboring pixel includes the next pixel of the current pixel in the prediction direction and the neighboring pixel of the next pixel in the vertical direction perpendicular to the prediction direction. For example, if the prediction direction is pointing to the right, the predicted pixel is limited to the neighboring pixel on the right side of the current pixel and the neighboring pixels on the upper and lower sides of the neighboring pixel on the right. The classification model is, for example, a convolutional neural network (CNN) model such as AlexNet, VGG, ResNet, InceptionNet, GoogLeNet, or DenseNet, but this embodiment is not limited thereto.

Figure 5:
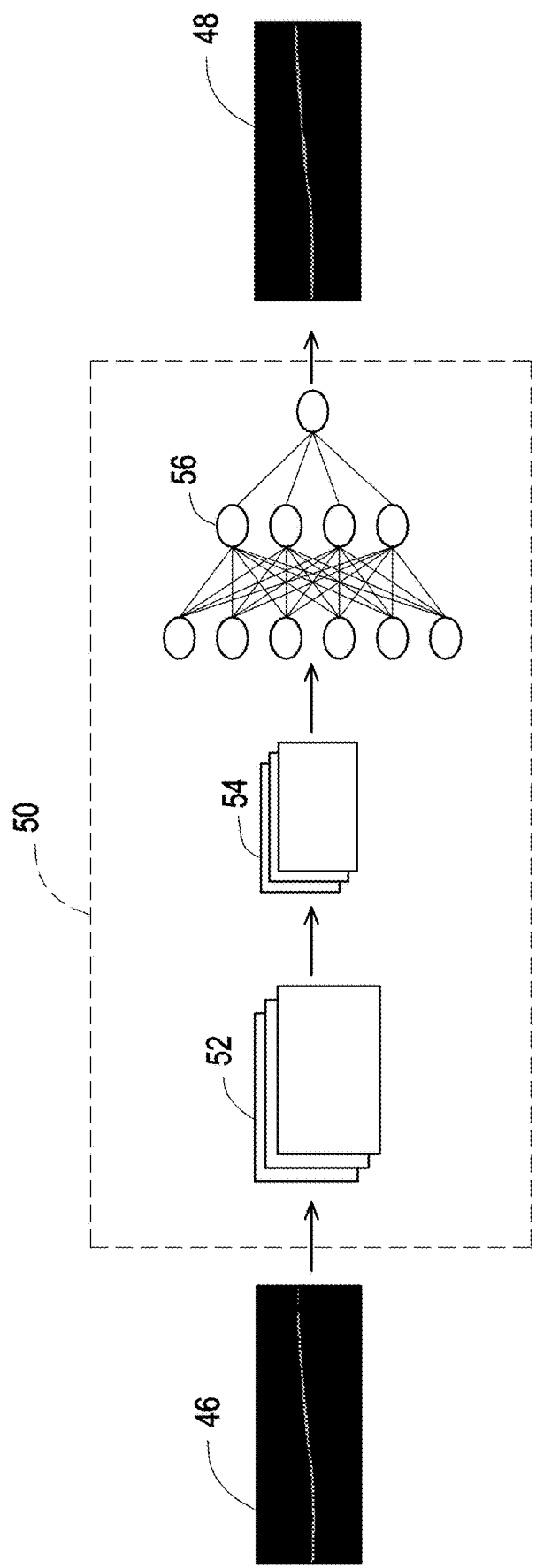
FIG. 5 is a schematic diagram of compensating for a segmentation line in a segmentation image using a classification model according to an embodiment of the present disclosure.

For example, FIG. 5 is a schematic diagram of compensating for a segmentation line in a segmentation image using a classification model according to an embodiment of the present disclosure. In FIG. 5, a convolutional neural network is taken as an example in this embodiment. The output of the previous stage (that is, the segmentation image 46 obtained through the image segmentation process of FIG. 4) is collected and adopted as the input image 46 of the classification model 50, on which the convolution operation is performed using the kernel of the classification model 50 to obtain convolution layers 52 and 54, then this convolutional layer 54 is sent to a fully connected layer 56 of the classification model 50 (including, for example, the output layer used for extracting feature and outputting decided results). The weights of each kernel, convolution layer, and nodes of the fully connected layer of the classification model 50 are obtained, for example, by training using a large amount of training data (including input and output images) so that a classification operation can be performed on the segmentation image 46. The final output includes an output image 48 in which the segmentation line has been compensated.

In some embodiments, before classifying the segmentation image, the processor 26 determines the size of the kernel used in the classification model based on the size of the gap section, for example, by detecting the gap section in each segmentation line in the segmentation image, so that the gap sections can be connected smoothly since the positions of the two end points of the gap section are taken into consideration. The processor 26 calculates, for example, the distance (pixels) between the two endpoint pixels of the detected gap section in the prediction direction of the kernel to set the length of the kernel in the prediction direction accordingly, so that the length of the kernel is greater than the distance. For example, if the length of the gap section in all the segmentation lines in the segmentation image is at most 2 pixels, a kernel with a length of 4 or 6 pixels may be adopted to perform the convolution operation on the segmentation image.

In some embodiments, the processor 26 may also determine one or a combination of the kernel size and the padding size adopted by the classification model, for example, according to the use requirements of the medical images. For example, to increase the fineness of the segmentation line compensation, one can choose to use a smaller kernel to perform the convolution operation.

Finally, in step S306, the processor 26 connects the predicted pixels to form a compensated segmentation line for each segmentation line. That is, the final output of the processor 26 is a complete segmentation line whose gap section has been repaired.

Figure 6A:
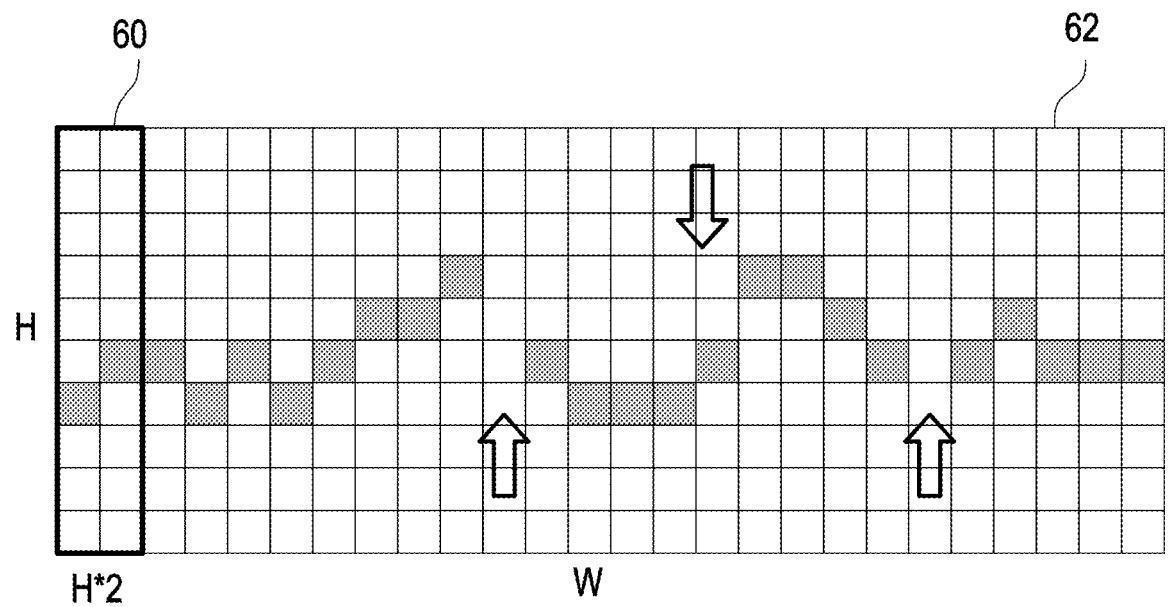
FIG. 6A to FIG. 6D are schematic diagrams of convolution operations on a segmentation image using a kernel according to an embodiment of the present disclosure.
Figure 6B:
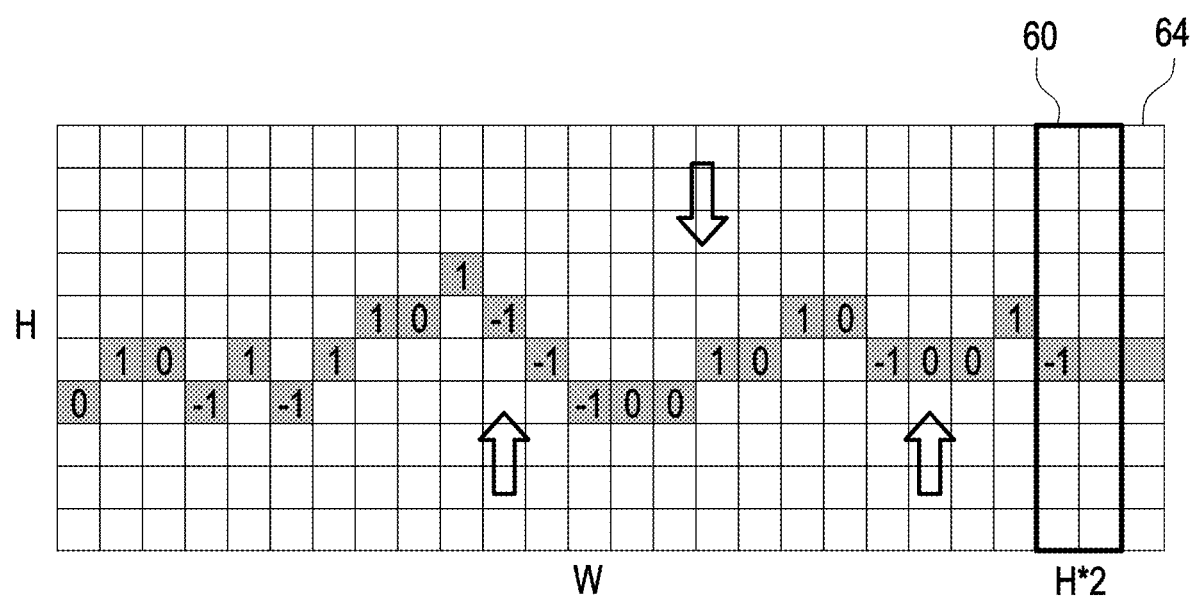
Figure 6C:
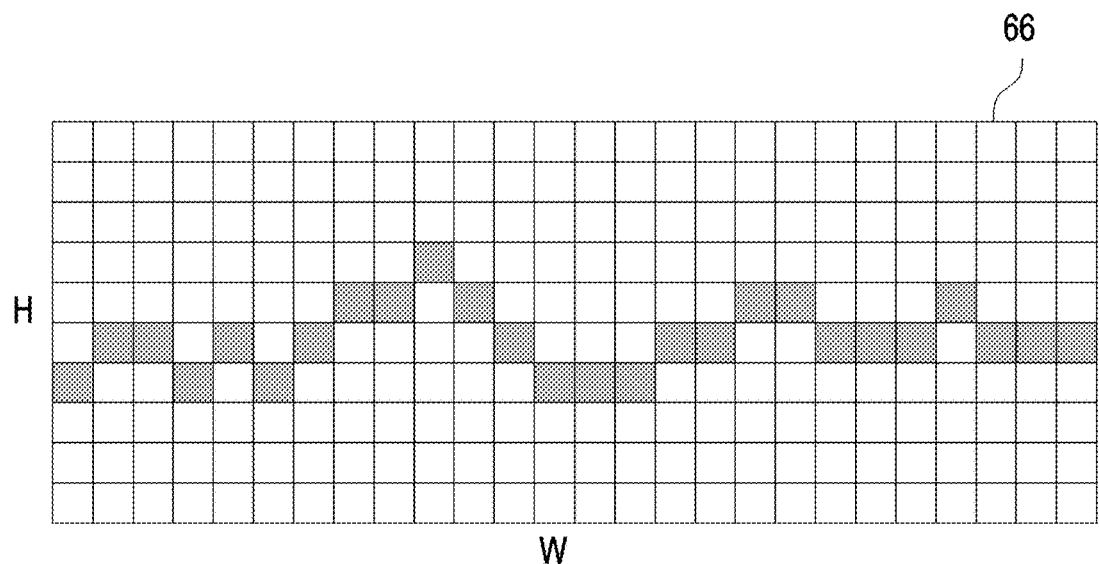
Figure 6D:
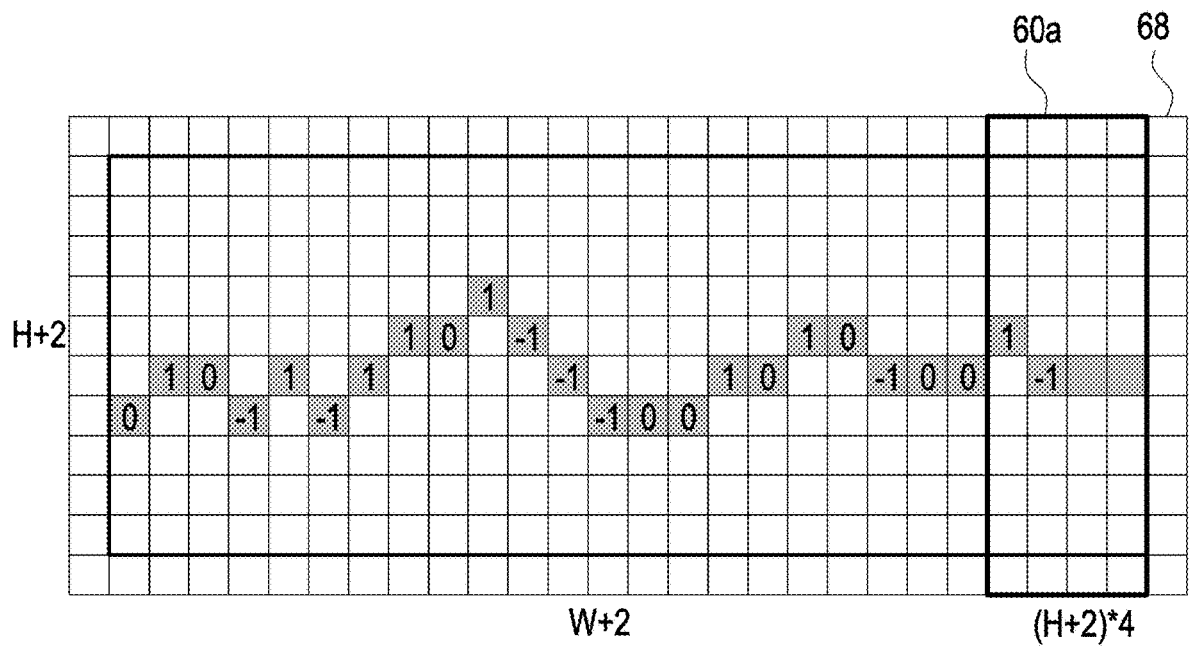

For example, please refer to FIG. 6A to FIG. 6D, which are schematic diagrams of performing the convolution operation on a segmentation image using a kernel according to an embodiment of the present disclosure. In FIG. 6A, the image 62 is a segmentation image obtained after image segmentation, and its size is H*W. In this embodiment, the size of the kernel 60 adopted by the classification model is H*2, the stride length is 1, the padding size is 0, and the output is Y. The place pointed out by the arrow represents the gap. The H*2 space in the image 62 is scanned from left to right by the kernel 60 to output a sequence of the output Y having a length of W−1 in the end. By setting the restriction condition to [−1, 0, +1], the kernel 60 is restricted to predict the y-coordinate trend of the next pixel x, so that each pixel in the x and y directions are connected. As a result, as shown in the image 64 of FIG. 6B, in contrast to FIG. 6A, the original gap point indicated by the arrow has been filled. The classification model receives the sequence generated by the prediction of each pixel, such as [1, 0, −1, . . . , −1, Pred$_{W-2}$, Pred$_{W-1}$]. And this sequence is drawn into the image 66 shown in FIG. 6C to serve as the final output image.

In some embodiments, the aforementioned classification model can also change its parameters based on different requirements. For example, in order for the kernel to cover a wider feature area, the kernel may be changed to a kernel 60a having a size of (H+2)*4 as shown in the image 68 of FIG. 6D, where the stride length is 1 and the padding size is 1. In this way, the length of the output Y is still maintained as W−1 while the kernel is larger.

Note that the adjustment of the above parameters meets the following restrictions.

$$\frac{W + 2*\text{padding} - \text{kernel\_size}}{\text{stride}} + 1 = W - 1, \text{stride} = 1 \quad (1)$$

$$\text{kernel\_size} = 2*+2 \quad (2)$$

In the above equations, kernel_size represents the size of the kernel, stride represents the stride length (which is fixed to 1), and padding represents the padding size. The padding size can be obtained from the formula (2) and will be automatically adjusted with the size of the kernel, and it must be a positive integer at the same time. Its purpose is to ensure that the length of the output Y is W−1.

In summary, the method and the apparatus for compensating image segmentation lines of the embodiments of the present disclosure adopt a trained classification model to extract features from a segmentation image. By fixing the length of the output Y to W−1 and limiting the predicted pixels to the neighboring pixel in the prediction direction, the classification model extracts more information to connect lines more accurately. In this way, even if the colors of the object pixels in the image are similar, the lines can be connected smoothly, and when facing different image information in the future, some parameters can be adjusted to meet the customized requirements to meet the precise requirements of different tasks.

Although the present disclosure has been disclosed in the above embodiments, it is not intended to limit the present disclosure. Anyone with ordinary knowledge in the relevant technical field can make changes and modifications without departing from the spirit and scope of the present disclosure. The scope of protection of the present disclosure shall be subject to those defined by the claims attached.

What is claimed is:

1. A method for compensating image segmentation lines suitable for electronic apparatus with a processor, the method comprising:
    segmenting a captured medical image by adopting a segmentation model to obtain a segmentation image comprising at least one segmentation line between a plurality of layers in the medical image;
    performing a convolution operation on the segmentation image by adopting a kernel of a trained classification model to predict a position of a next pixel connected to a current pixel of the respective segmentation line in the segmentation image, wherein the predicted pixel is a neighboring pixel of the current pixel in a prediction direction; and
    connecting a plurality of predicted pixels to form a compensated segmentation line for the respective segmentation line.

2. The method for compensating image segmentation lines according to claim 1, further comprising:
    detecting a gap section in the respective segmentation line, and determining a kernel size of the classification model based on a size of the gap section.

3. The method for compensating image segmentation lines according to claim 2, wherein determining the size of the kernel of the classification model based on the size of the gap section comprises:
    calculating a distance between two endpoint pixels of the detected gap section in the prediction direction of the kernel, and setting a length of the kernel in the prediction direction accordingly, so that the length is greater than the distance.

4. The method for compensating image segmentation lines according to claim 1, further comprising:
  according to use requirements of the medical image, determining one or a combination of a kernel size and a padding size adopted by the classification model.

5. The method for compensating image segmentation lines according to claim 1, wherein the neighboring pixel comprises a next pixel of the current pixel in the prediction direction and neighboring pixels in a vertical direction perpendicular to the prediction direction of the next pixel.

6. An apparatus for compensating image segmentation lines, comprising:
  an image capturing device, adapted to capture a medical image;
  a storage device, adapted to store a computer program; and
  a processor, coupled to the image capturing device and the storage device, and configured to load and execute the computer program to:
    segment the captured medical image by adopting a segmentation model to obtain a segmentation image comprising at least one segmentation line between a plurality of layers in the medical image;
    perform a convolution operation on the segmentation image by adopting a kernel of a trained classification model to predict a position of a next pixel connected to a current pixel of the respective segmentation line in the segmentation image, wherein the predicted pixel is a neighboring pixel of the current pixel in a prediction direction; and
    connect a plurality of predicted pixels to form a compensated segmentation line for the respective segmentation line.

7. The apparatus for compensating image segmentation lines according to claim 6, wherein the processor further detects a gap section in the respective segmentation line, and determines a kernel size of the classification model based on a size of the gap section.

8. The apparatus for compensating image segmentation lines according to claim 7, wherein a distance between two endpoint pixels of the detected gap section in the prediction direction of the kernel is calculated, and a length of the kernel in the prediction direction is set accordingly, so that the length is greater than the distance.

9. The apparatus for compensating image segmentation lines according to claim 6, wherein the processor further determines one or a combination of a kernel size and a padding size adopted by the classification model.

10. The apparatus for compensating image segmentation lines according to claim 6, wherein the neighboring pixel comprises a next pixel of the current pixel in the prediction direction and neighboring pixels in a vertical direction perpendicular to the prediction direction of the next pixel.

* * * * *